June 21, 1938.     A. G. BOWERING     2,121,474
BAIT
Filed Jan. 24, 1936
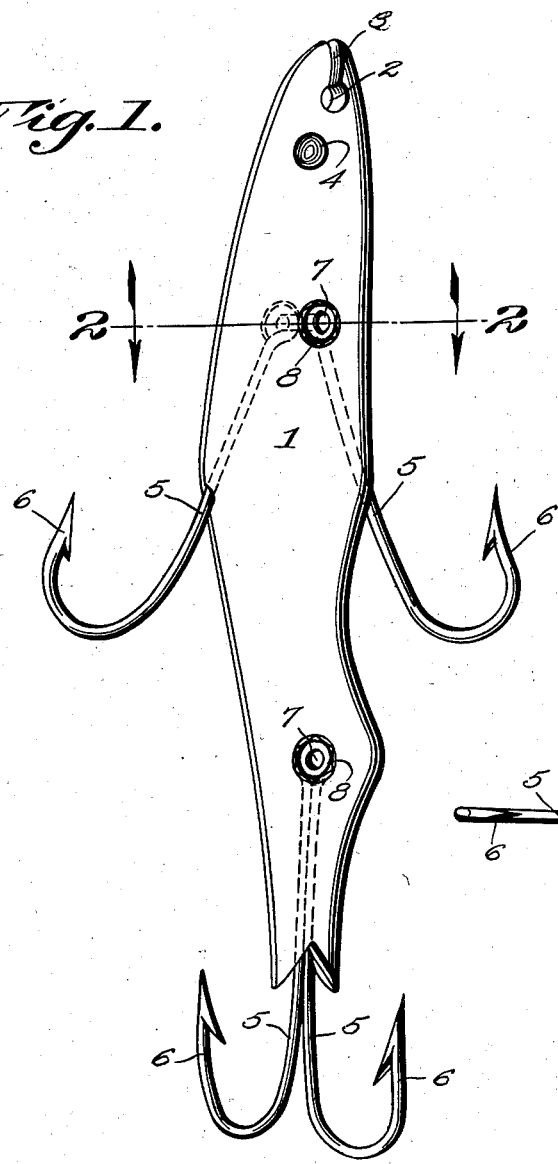
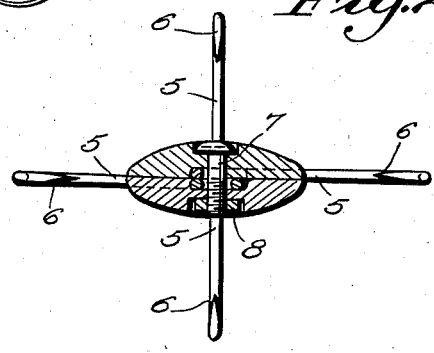
Allan G. Bowering
INVENTOR Patented June 21, 1938

2,121,474

UNITED STATES PATENT OFFICE 2,121,474

BAIT

Allan G. Bowering, Heuvelton, N. Y.

Application January 24, 1936, Serial No. 60,684

2 Claims. (Cl. 43—46)

This invention relates to bait especially adapted for deep sea fishing and has for the primary object the provision of a highly polished body of a selected shape and weight and equipped with hooks so that it will readily sink in water and attract fish thereto due to its brilliancy and its shape representing a certain live bait and when struck by a fish and a sudden pull made on the fishing line to which it is attached the fish will be snagged by one of the hooks and certain of said hooks may have bait of some selected kind applied thereto when desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating an artificial bait constructed in accordance with my invention, and Figure 2 is a sectional view taken on the line 2—2 of Figure 1.

Referring in detail to the drawing, the numeral 1 indicates an elongated body of elliptical shape in cross section and its general outline simulates a selected live bait, the head end thereof being provided with an opening 2 with opposite grooves 3 communicating with said opening and opening outwardly of the head end. The opening 2 and grooves 3 are employed for securing a fishing line to the body 1. The opposite end of the body 1 is in tail shape and located adjacent the opening 2 and upon opposite sides of the body are recesses 4 representing eyes. The body 1 is constructed of metal or any other material suitable for the purpose so as to give the body 1 a desired weight whereby the body will readily sink when deposited in the water. The material from which the body is made is polished or treated to present to the body a highly polished surface, the brilliancy of which, when in the water, will attract fish to the device.

The body 1 is composed of companion sections extending longitudinally of the body and the opposed faces of the sections have formed therein grooves to receive shanks 5 of hooks 6. The hooks are preferably grouped in pairs, one pair being located at the tail end of the body and extending in opposite directions to each other. The other pair of hooks are located substantially midway of the body and extend from the latter at opposite edges thereof. The pair of hooks last referred to are arranged at right angles to the pair of hooks carried by the tail end of the body. Bolts 7 having nuts 8 detachably connect the sections of the body together with the shanks of the hooks lying in the grooves. The bolts 7 also extend through the usual eyes of the hooks and thereby firmly and detachably secure the hooks to the body.

With reference to Figure 2 it will be seen that the hooks arranged in pairs as before described project from opposite sides of the body and opposite edges of the latter so that a fish striking at the body and the latter given a sudden movement by the jerking of the line attached thereto will cause the fish to become snagged by one of the hooks.

The body being constructed of companion sections and detachably connected to each other by the bolts permits the sections to be more readily treated to present the polished surfaces as well as providing means for permitting the hooks to be detached and replaced to the body as desired. The detachment of the hooks from the body permits the latter to be equipped with hooks of different sizes. During the use of this device as artificial bait should it be desirable to employ bait of some kind in conjunction therewith, a selected bait may be applied to the forward pair of hooks leaving the tail end hooks unobstructed to snag into a fish should the fish attempt to take the bait from the forward hooks. The body 1 being of a selected weight so it will readily sink when deposited in the water obviates the necessity of attaching sinkers or the like on the fishing tackle.

Having described the invention, I claim:

1. A bait comprising an elongated body of a weight to bring about sinking thereof in water and shaped to represent a live bait and having its surfaces polished to a desired brilliancy, said body including companion sections extending longitudinally of the body and having grooves formed in the opposing faces thereof and opening outwardly through opposite edges and one end of the body, fishing hooks lying partially within said grooves, and fasteners extending through the sections of the body and eyes of the hooks for detachably connecting the sections together and the hooks to the body, said body having an opening and grooves communicative therewith and located adjacent one end of the body to receive a fishing line.

2. A bait comprising an elongated body of a weight to bring about sinking thereof in water and shaped to simulate live bait, said body including companion sections extending longitudinally of the body, fishing hooks having eyes lying between said sections and extending from opposite sides and opposite edges of said body so that said hooks are disposed about said body in angularly spaced relation in positions substantially 90° apart, and combined connecting and fastening means extending through the sections and the eyes of the hooks for detachably connecting the sections together and removably fastening the hooks between the sections.

ALLAN G. BOWERING.